UNITED STATES PATENT OFFICE.

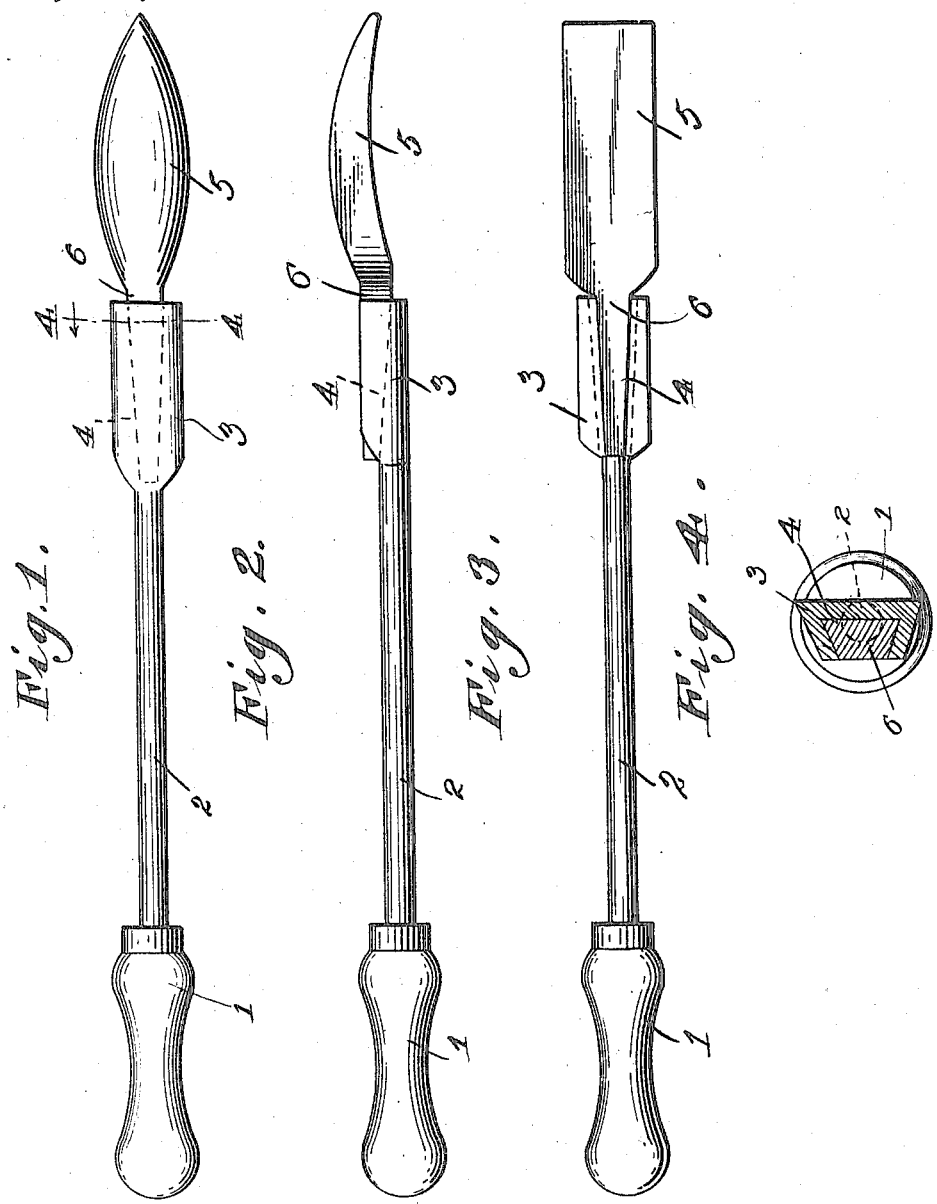

ANDREW SMITH, OF CLEVELAND, OHIO.

TOOL.

1,249,529.  Specification of Letters Patent.  Patented Dec. 11, 1917.

Application filed February 1, 1916. Serial No. 75,601.

*To all whom it may concern:*

Be it known that I, ANDREW SMITH, a subject of the King of Great Britain, residing at Cleveland, in the county of Cuyahoga and State of Ohio, have invented certain new and useful Improvements in Tools, of which the following is a specification.

An object of my invention is to provide a scraper for use by mechanics and others, which tool comprises a handle having a socket portion in which blades or points may be removably and interchangeably fitted, thus making the device adaptable to hold scraper blades or points which are half round, flat, triangular or of any other desired configuration.

A further object is to so construct the handle that the socket thereof is of dovetailed tapered formation, thus making it possible to fit the points to be rigidly held and at the same time to be readily removable.

With the above and other objects in view, my invention consists in certain novel features of construction and combinations of parts which will be hereinafter set forth in connection with the accompanying drawings and then pointed out in the claim.

In the drawings:—

Figure 1 is a view in top plan of a tool constructed after my invention.

Fig. 2 is a view in edge elevation of the disclosure in Fig. 1.

Fig. 3 is a bottom plan view of the tool.

Fig. 4 is a transverse sectional view taken on the line 4—4 of Fig. 1 and looking in the direction of the arrow.

As illustrated in the drawings, the tool comprises a handle 1 which may be of the usual form and shaped to be received and readily gripped within the hand. A stem 2 is secured in this handle 1 and at its outer end is widened out as at 3, and is thickened on the upper side.

The widened out portion at the outer end of the stem has a socket 4 of dovetail shape in cross section provided therein, which socket is tapered and convergent as it extends from the extreme end of the widened out portion 3. As will be noticed by reference to Figs. 2 and 3, it is preferable that the socket 4 be tapered both as to the depth which it is sunk into the widened out portion 3 and as to the transverse width thereof. The points or blades 5, which may be half round, as shown in Figs. 1 and 2, flat as illustrated in Fig. 3, triangular or of any other desired configuration in cross section, have the shank portion 6 thereof made of a size to be fitted within the dovetailed tapered socket 4 of the widened out portion 3 of the outer end of the stem 2, and it will of course be understood that this shank portion 6 will be made dovetailed and tapered along the same lines as those followed in the formation of the socket opening 4. In constructing a tool after my invention, the handle and holder portions may be constructed to a standardized measurement and then by making the blades or points 5 also to this standardized measurement in so far as the shank portions 6 thereof are concerned, each handle may be furnished with a set of points or blades of the various forms, and in this way the one holder may be made to serve for each of the various types of scraper points or blades which it may be desired to use. Further in this connection, the point may be made of a hardened steel whereas the stem 2 may be made of a malleable metal and thus if the tool be dropped, the only part which can be injured will be the point and this can be readily replaced, whereas with the ordinary form of tool of this nature, which tool is constructed of one piece of metal from the handle to the tip of the point, dropping the tool will very often cause the metal portion thereof to be broken and this requires that an entirely new tool be procured or that the old tool be worked over to secure the proper configuration of the point, this latter however, being in many cases impossible, due to the fact that the tool has been broken off too near the handle.

While I have herein shown and described only one specific form of the invention, it will be understood that the shape and design of the handle as well as the stem and widened out end thereof, and also the form and design of the points may be varied without departing from the spirit and scope of my invention, and hence, I do not wish to be limited to the exact construction hereinbefore set forth but only to such points as may be set forth in the claim.

I claim:—

In a tool, a stem widened out at one end and thickened on one side, said stem having a dovetailed socket formed within the widened out portion and to extend along the thickened side thereof, said socket being shaped to be of less transverse extent and of less depth at the inner end and thus given a gradual taper in its two cross-dimensions from the outer end, a point, and a shank formed as a part of said point made of dovetailed form and tapered in its two cross-dimensions to be received and to wedge within the socket, the formation of the socket within the thickened side of the stem and out of line with the same leaving the inner end thereof open to thus allow driving force to be exerted against the shank in removing the point from the fitted and wedged position.

In testimony whereof I affix my signature in presence of two witnesses.

ANDREW SMITH.

Witnesses:
 ARTHUR HIGGINS,
 M. J. HIGGINS.